US009218405B2

(12) United States Patent
Baumgarten et al.

(10) Patent No.: US 9,218,405 B2
(45) Date of Patent: Dec. 22, 2015

(54) BATCH PROCESSING AND DATA SYNCHRONIZATION IN CLOUD-BASED SYSTEMS (71) Applicant: Apple Inc., Cupertino, CA (US)

(72) Inventors: John S. Baumgarten, San Jose, CA (US); Nicholas K. Puz, San Jose, CA (US); Thomas L. Byrne, Belpre, OH (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/650,122

(22) Filed: Oct. 11, 2012

(65) Prior Publication Data
US 2014/0101102 A1 Apr. 10, 2014

Related U.S. Application Data (60) Provisional application No. 61/712,255, filed on Oct. 10, 2012.

(51) Int. Cl.
*G06F 17/30* (2006.01)
(52) U.S. Cl.
CPC .... *G06F 17/30575* (2013.01); *G06F 17/30174* (2013.01); *G06F 17/30578* (2013.01)
(58) Field of Classification Search
CPC ............ G06F 15/167; G06F 17/30194; G06F 12/0811; G06F 17/30221; G06F 3/067
USPC ......... 707/609, 610, 611, 612, 613, 614, 615, 707/616, 617, 618, 619, 620, 624, 656, 658, 707/694, 796, 945, 999.004, E17.014, 707/E17.005, 758, 827, 634, 769, E17.001, 707/E17.01, E17.028, E17.032, E17.044, 707/E17.046, E17.101, 645, 649, 661, 667, 707/687, 705, 722, 723, 727, 737, 741, 756, 707/766, 770, 781, 784, 803, 812, 821; 711/E12.001, E12.002, 114, 118, 122, 711/165, E12.017, E12.022, E12.103, 111, 711/135, 162; 705/39, 28, 313, 319, 14.1, 705/14.23, 1.1, 26.7, 27.1, 3, 30, 317, 320, 705/40, 5, 59
See application file for complete search history.

(56) References Cited

U.S. PATENT DOCUMENTS 5,717,924 A * 2/1998 Kawai
5,995,980 A 11/1999 Olson et al.
(Continued)

OTHER PUBLICATIONS

Shadgar et al., 2003, "An Application for WebDAV-based Authoring of Databases—WebDAD", University of Bristol, U.K Department of Computer Science, 2pp.

*Primary Examiner* — Jay Morrison
*Assistant Examiner* — Ken Hoang
(74) *Attorney, Agent, or Firm* — Downey Brand LLP (57) ABSTRACT Disclosed are methods and apparatus for efficiently storing application data received from clients in a database stored on a server, such as a cloud-based database. The methods include receiving a batch of a plurality of web operations that specify actions to be performed on data objects that represent application data stored in a cloud database, translating the web operations to a batch of data storage operation sets, creating a temporary database having a subset of contents of the cloud database, applying the data storage operation sets to the temporary database, recording database operations generated by the temporary database based on the plurality of data storage operation sets, and applying the plurality of database operations to the cloud database in a transaction. Translating the web operations can include mapping the actions to be performed on the data objects to transactions to be performed on the cloud database.

20 Claims, 3 Drawing Sheets

(56) References Cited

U.S. PATENT DOCUMENTS

| | | |
|---|---|---|
| 6,360,229 B2 | 3/2002 | Blackman et al. |
| 6,643,633 B2 | 11/2003 | Chau et al. |
| 6,928,458 B2 * | 8/2005 | Cedola et al. |
| 7,299,230 B2 | 11/2007 | Liou et al. |
| 8,121,978 B2 | 2/2012 | Wiss et al. |
| 8,346,645 B1 * | 1/2013 | Stewart et al. ............... 705/36 R |
| 2002/0049776 A1 * | 4/2002 | Aronoff et al. ................ 707/200 |
| 2004/0103084 A1 * | 5/2004 | Megerian ........................... 707/3 |
| 2006/0101064 A1 * | 5/2006 | Strong et al. ................... 707/102 |
| 2009/0037452 A1 * | 2/2009 | Baitalmal et al. .............. 707/101 |
| 2009/0037492 A1 * | 2/2009 | Baitalmal et al. .............. 707/201 |
| 2009/0228509 A1 * | 9/2009 | McCarthy et al. ............. 707/102 |
| 2011/0126197 A1 * | 5/2011 | Larsen et al. ...................... 718/1 |
| 2011/0208695 A1 * | 8/2011 | Anand et al. ................... 707/610 |
| 2011/0246434 A1 * | 10/2011 | Cheenath et al. .............. 707/703 |
| 2011/0282969 A1 * | 11/2011 | Iyer et al. ....................... 709/217 |
| 2012/0233354 A1 * | 9/2012 | Salmon et al. ................. 709/248 |
| 2014/0095233 A1 * | 4/2014 | Yeung et al. .................. 705/7.12 |

* cited by examiner

BATCH PROCESSING AND DATA SYNCHRONIZATION IN CLOUD-BASED SYSTEMS

CROSS REFERENCE TO RELATED APPLICATIONS

This application claims priority to U.S. Provisional Patent Application No. 61/712,255, filed Oct. 10, 2012, entitled "BATCH PROCESSING AND DATA SYNCHRONIZATION IN CLOUD-BASED SYSTEMS," which is incorporated herein by reference in its entirety and for all purposes.

TECHNICAL FIELD

The present invention relates generally to data storage in computer systems. More particularly, the present embodiments relate to synchronization of data across multiple devices via a communication network.

BACKGROUND

As cloud computing and portable computing devices have grown in popularity and capability, there has been a proliferation of applications storing data on network servers, with users accessing the data via devices running different applications that may store and retrieve data of different types and formats. Millions of devices access cloud services through devices such as desktop computers, smart phones, tablet computers, and the like. Users expect application data such as documents, calendar entries, and the like to be stored quickly and correctly in the cloud, e.g., on networked servers, and replicated automatically across each of the user's devices.

SUMMARY

In one or more embodiments, devices that store data on cloud-based servers send batches of web-oriented operations to the cloud servers to store, retrieve, and manipulate application data associated with data objects. The cloud servers translate these operations to database operations, such as operations on a relational database. The operations include constraints that are mapped to database constraints, and applying the batches of operations to the relational database involves translating constraints as well as the operations themselves to the operations on the relational database. Translating batches of operations by translating each operation in the batch to the corresponding database operation, and then submitting the individual batches of database operations to the database is complex.

One or more embodiments involve translating each web operation in the batch of web operations to the corresponding data storage operations to form a set of data storage operations. A number of sets of data storage operations are therefore generated based on the batch of web operations. A temporary database instance is created having a subset of the data in the cloud database, and the operations in the sets of data storage operations are applied to the temporary database, which generates a record of the database operations involved in applying the sets to the temporary database. The database operations in this record are then applied to the cloud database itself, thereby resulting in the actions specified in the web-oriented operations being applied to the cloud database without complex translation of batches of operations.

In one or more embodiments, a method includes receiving a batch of a plurality of web operations that specify actions to be performed on data objects that represent application data stored in a cloud database, translating the plurality of web operations to a batch of a plurality of data storage operation sets that are compatible with a data storage interface of the cloud database, creating a temporary database having a subset of contents of the cloud database, applying the plurality of data storage operation sets to the temporary database, recording a plurality of database operations generated by the temporary database based on the plurality of data storage operation sets, and applying the plurality of database operations to the cloud database in a transaction, wherein applying the database operations to the cloud database results in the actions specified in the plurality of web operations being applied to the cloud database.

Embodiments of the invention can include one or more of the following features. Translating the plurality of web operations can include mapping the actions to be performed on the data objects to transactions to be performed on the cloud database, wherein the data objects are mapped to data items in the cloud database. The cloud database can be a relational database, and the data items can be rows in the relational database. Each data storage operation set in the plurality of data storage operation sets can include one or more data storage operations that perform an operation specified in a corresponding web operation from the batch of web operations. The data storage operations can specify relational database actions to be performed on data stored in the cloud database. The data storage operations can include operations to insert, update, or delete data in the cloud database.

The method can include determining a sub-batch size based upon available resources, dividing the batch of web operations into a plurality of sub-batches having sizes based upon the sub-batch size, wherein translating the web operations comprises translating one of the sub-batches to a corresponding subset of data storage operations, and applying the data storage operations to the temporary database can comprise applying the subset of data storage operations to the temporary database. The web operations can specify web protocol actions to be performed on objects identified by web addresses. The web operations can include operations to get, insert, update, or delete data associated with the objects specified in the operations. The method can further include rejecting one or more of the web operations that do not satisfy one or more constraints associated with the objects.

Applying the plurality of data storage operation sets to the temporary database can cause a fault to occur if the temporary database does not contain one or more data items referenced by the plurality of data storage operation sets, and the method can further include loading the one or more data items into the temporary database in response to the fault. The method can further include deleting the temporary database subsequent to applying the plurality of database operations to the cloud database. Creating the temporary database can include creating an empty database instance, and storing a predetermined subset of the contents of the cloud database in the temporary database.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

In one or more embodiments, devices that store data on cloud-based servers send batches of web-oriented operations to the cloud servers to store, retrieve, and manipulate application data associated with data objects. The cloud servers translate these operations to database operations, such as operations on a relational database. The operations include constraints that are mapped to database constraints, and applying the batches of operations to the relational database involves translating constraints as well as the operations themselves to the operations on the relational database. Translating batches of operations by translating each operation in the batch to the corresponding database operation and submitting batches of database operations to the database is complex.

A solution in presented that involves translating each web operation in the batch of web operations to the corresponding data storage operations to form a set of data storage operations. A number of sets of data storage operations are therefore generated based on the batch of web operations. A temporary database instance is created having a subset of the data in the cloud database, and the operations in the sets of data storage operations are applied to the temporary database, which generates a record of the database operations involved in applying the sets to the temporary database. The database operations in this record are then applied to the cloud database itself, thereby resulting in the actions specified in the web-oriented operations being applied to the cloud database without complex translation of batches of operations.

Figure 1:
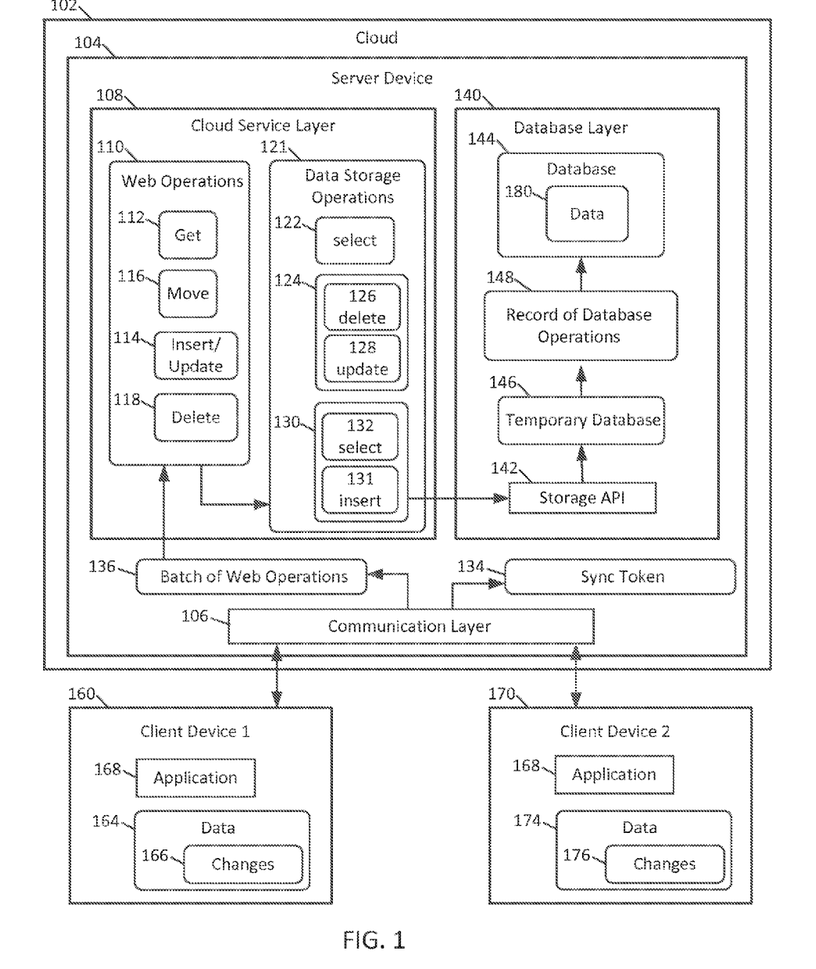
FIG. 1 is an illustrative diagram showing batch processing of data into a cloud database in accordance with one or more embodiments.

FIG. 1 is an illustrative diagram showing batch processing of data into a cloud database 144 in accordance with one or more embodiments. The cloud database 144 is referred to as a "cloud" database for purposes of description, and should be understood to be a database of an appropriate type, e.g., a relational database, that is accessed by a server device 104. The database 144 can thus be located on the server 104 or on a different server. Application data 164, 174, such as calendar data, contact lists, bookmarks, documents, and the like can be created, viewed, and modified by applications 168 running on devices 160, 170 such as laptop computers, desktop computers, mobile phones, tablet computers, and the like. This application data 164 on one device 160 can be synchronized, i.e., saved to and retrieved from, other computers or devices 170, such as a user's desktop computer, a user's mobile device a server computer 104 provided by a cloud service 102, e.g., the iCloud™ service provided by Apple Inc. of Cupertino, Calif. As a result of the synchronization, the application data 164, 174 can be merged together and stored in a persistent database 144, e.g., Oracle® relational database or the like, as database-resident data 180. Note that the term "stored" is used herein to refer to the existence, creation, or updating of data on a storage medium or in a memory, e.g., as a result of application operations, or as a result of synchronization. The term "stored" can also refer to the saving of data to a storage medium or in a memory, depending on the context in which the term is used. Device-resident data 164, 174 can be stored in storage media local to the devices 160, 170 and is ordinarily a subset of the cloud-resident data 180. Cloud-resident data 180 includes merged copies of the device-resident data 164, 174 received from the devices 160, 170 for a particular application 168 associated with a particular user.

Thus, in one or more embodiments, although application data 164, 174 is often created or edited on one device 160, the data is made accessible to other devices 170, such as a set of devices associated with the same user account. The updates to the data 164 at one device 160 should be made accessible at other devices 170 quickly, so that when the user accesses device-resident application data 174, e.g., from the corresponding application 168 at another device 170, the most recent changes made by the user on other devices 160 are reflected in the data 174 accessed at the particular device 170. There may be delays between the time the changes 166 are made at one device 160 and the time the changes 166 become accessible at other devices 170, but such delays should be kept as small as reasonably possible, so that the data 164, 174 provided to applications 168 at each device 160, 170, when requested or needed, is up-to-date, i.e., current. Since there can be millions of devices such as the devices 160, 170 accessing the servers 104 that provide the cloud service 102, the transfer of application data 164, 174 between devices 160, 170 and the server(s) 104 can have a significant effect on system performance. For example, the more data that is transferred between a user's device and a server when the user modifies a portion of the data, the more network and computation resources will be used to update the other devices. If the data transfers are not done efficiently, the load on the cloud system, including the network and servers, can increase substantially when users synchronize application data with the cloud service, which can result in slow system performance, a need to upgrade hardware, and other performance issues.

In one example, the application data 164, such as contacts, calendars, collections, and the like, is stored as sets of application data items in data structures referred to herein as "collections." A user may therefore have a collection of calendar items, for example. A client device 160, such as a smart phone, may want to read or write many of these data items and/or collections at once. Sending one data item at a time, e.g., in separate messages, to the server via a communication network, e.g., the Internet or the like, is inefficient. Therefore, in one or more embodiments, the data items are sent via the communication network in batches. Thus, when changes are made to data at a client device 160 that is offline, e.g., not connected to the network and unable to access the server, those changes are stored in a memory of the client device. In another example, when a device 160 is first connected to the cloud service 102, the device may have a large quantity of data to synchronize to the cloud service 102.

In one or more embodiments, each type of data 164 has particular characteristics and transition states. Therefore, for example, contacts are not duplicated, calendar events are stored on the correct calendar, and so on. A set of web operations 110, e.g., methods and rules, are used to write and read the data items in an efficient, orderly fashion. For example, if changes 166 are made to device-based data 164 at a first client device 160, those changes are sent to the cloud service 102, and a cloud service layer 108 keeps track of what portions of the corresponding cloud-based data 180 are changed as a result of the changes made on the client device 160. If a second client 170 using the same user account and application subsequently synchronizes with the cloud service 102, the second client 170 sends a sync token 134 to the cloud service 102, and requests all the changes from a period of time, such as the time that has elapsed since the sync token 134 was generated. The client 170 receives those changes and applies (e.g., merges) them to its local database 174. The client 170 can then send any locally-generated changes 176 that it has made, such as changes generated by an application 168 running on the device 170, and the changes 176 from the client are applied to the cloud-based data 180. The cloud service layer 108 receives the changes along with the current sync token from the second device 170 as operations 110, and verifies that the current sync token of the second device 170 is up to date. If so, the cloud service layer 108 uses the web operations 110, e.g., methods and rules, to perform the appropriate operations that apply the received operations 110 to the cloud-resident data 180 in cloud database 144. If the sync token received from the second device 170 does not match the current cloud database 144, then the second device 170 synchronizes to receive the latest updates in the cloud database 144, and then the cloud service layer 108 checks the second device's sync token again. This synchronization can be repeated until the sync token matches the current cloud database 144.

In one or more embodiments, the web operations 110 include a Get operation 112, an insert/update operation 114, a move operation 116, and a delete operation 118. Each operation has constraints that apply to an individual piece of data or a collection of data. The constraints depend on a current state of the client device 160 that requested the synchronization operation. The client device 160 therefore sends a representation of its current state (which can be, for example, a number corresponding to a state) to the cloud service 102 when invoking the synchronization operation. Thus, the client 160 sends an indication that it is in a particular state, either for an individual piece of data or for a collection of data, and a request to perform a web operation 110 based on the cloud database 144 being in a state that the client 160 expects the cloud database 144 to be in. As operations 148 are processed, the c-tag changes, because with each write to a collection, the collection's version changes. An instruction is therefore used to indicate to the database 144 or 146 that a transaction is to be done as a batch, and the collection will change. A change to the collection is allowed as long as the change is requested by requestor of this transaction.

In one example, the web operations 110 can be WebDAV (Web Distributed Authoring and Versioning) operations. Specific protocols can be used for specific types of objects, e.g., CardDAV for contact, CalDAV for calendars, and BookmarkDAV for bookmarks. Each object in the application data 164 or cloud data 180, such as a bookmark, contact, or calendar event, has a corresponding URL. Each collection has a c-tag, which indicates the version of the collection. Children in the collection have e-tags, which indicate the versions of the items in the collection. A client can specify that an operation is to be performed if the e-tag matches (or doesn't match). A client can also specify that an operation is to be performed if the parent c-tag matches. The c-tags and e-tags are translated into database constraints that are submitted to the database 144.

Locking can be used, in which the client 160 requests one of the web operations 110, the client 160 acquires a lock object. In one example, there are two types of locking: optimistic and pessimistic locking In pessimistic locking, the client 160 acquires a lock, synchronizes, sends changes to the cloud service 102, then releases the lock. Lock management for small, distributed devices over an unreliable device can be difficult, because of the need to establish the lock, and the possibility that the client will lose communication with the database server. For example, if a client 160 loses communication with the cloud service 102, then the data set for the user stays locked until the lock expires, thus preventing other updates to that dataset.

In one or more embodiments, optimistic locking is used, in which a set of changes is sent to the cloud service 102, and the changes include conditionals. The conditionals can be on individual pieces of data, or on a container of data. These conditionals are referred to herein as "constraints." The constraints are associated with conditionals, and specify an operation to be performed in the constraint applies. Thus, each of the operations 110 is associated with constraints that specify the conditions in which the corresponding operation can be performed correctly. The client can issue requests to perform a specified action if the constraint applies, and to perform another specified action if the constraint does not apply. In one or more embodiments, to achieve efficient synchronization, the web operations 110 that are performed using constraints are batched together, so that, for example, requests to perform multiple operations can be sent in a single batch.

Since a change to data on one device generates changes to be applied to other devices, communication occurs in bursts of data transfers. Therefore, a transactional database 144 is used to perform transactions on the data 180, and the data 180 is created and modified using database-centric operations such as insertions, updates, and queries that are issued by the cloud service layer 108. The interaction between the clients 160 and the cloud service layer 108, on the other hand, use HTTP-based protocols, since HTTP is a well-understood and accepted protocol. The web operations 110 therefore are translated between the client's HTTP-oriented representations of constraints and integrity, such as Insert, Move, Delete, and database-oriented operations 121 that use the transactional relational database representations of constraints and integrity used to access the database 144, such as SQL insert, update, and delete. A storage API 142 has methods that are similar to the HTTP-oriented web operations 110, but the storage API 142 methods are database-oriented.

In one or more embodiments, a translator translates the HTTP-based web operations 110 to database-based operations 121. The translator can produce one or more database operations 121 that correspond to each HTTP web operation 110 and perform the operation in a way that is consistent with the HTTP data model and preserve the constraint integrity specified in the HTTP operations 110. Further, the operations 110 can be received in batches, e.g., there can be multiple HTTP operations 110 in a single HTTP communication or message. In one example, to translate the batches of HTTP operations 110 to sequences of database operations 121, the logic in each of the HTTP operations 110 can be duplicated in another operation that handles batches of operations. The code in the operations 121 can be replicated in methods that receive a set of HTTP operations, translate them into storage operations, perform the set of storage operations, and translate the resulting database results into a set of operation responses that the client device 160 can correlate to each of the operations requested by the client device 160. Some of the requested operations may succeed and some may fail, so the client device 160 identifies the operation that corresponds to each response and performs the appropriate action for the operation based on the response, and maintain the local data 164 as a consistent copy of the relevant portion of the cloud data 180.

In one or more embodiments, instead of replicating the HTTP operations as described above, a batch of HTTP operations 110 can be mapped to operations that are performed on a temporary database 146. The batch of operations 110 is constructed in response to incoming HTTP request from a client device 160, and the operations 110 are performed on the temporary "shadow" database 146. A recorded set of storage operations 148 is produced as a result of the operations performed on the temporary database 146. The database can process this set, instead of a sequence of smaller sets as would be used in the translation technique described above. The recorded set of storage operations 148 are then applied to the database 144 as a transaction. The recorded set of operations 148 can be submitted to the storage API 142, in which case the storage API 142 applies the recorded operations 148 as a transaction. In other examples, the recorded operations 148 can be applied to the database 144 via other interfaces, such as an interface of the database 144. Thus, the batch of operations 110 is performed on a temporary shadow database 146 prior to being applied to the cloud database 144, the resulting operations 148 are recorded, and the recorded operations 148 are applied to the cloud database 144.

In one or more embodiments, the temporary shadow database 146 is generated by copying a subset of the data 180 in the cloud database 144. The temporary shadow database 146 does not have the constraints that the cloud database 144. In one aspect, the entire cloud database 144 is not copied to the temporary shadow database 146. Instead, only the data needed to perform the batch of operations is copied to the temporary shadow database 146, without copying any data not needed for the batch of operations. Just enough data is copied into the temporary shadow database 146 so that the needed operations 148 are generated and can be identified and applied to the cloud database 144.

In one aspect, the web operations 110 include constraints that check whether the database is in a certain state. To avoid simulating or reproducing the entire state of the database 144 to satisfy the constraints, the constraints are stripped off of the operations in the batch of operations. The batch of operations is submitted to the temporary database 146 without the constraints. The constraints are then re-applied to the recorded operations 148 that are produced from the temporary database 146, and the recorded operations 148, with the constraints, are supplied to the cloud database 144.

As an example, bookmark data that represents web browser bookmarks can be stored in a cloud database 144. The bookmarks are in particular order, e.g., a Home Depot bookmark followed by a Lowe's bookmark. Ordered data is stored as a parent collection, with bookmarks in the collection. Each bookmark has an associated number, e.g., the name Home Depot is associated with position 1, and Lowe's is associated with position 2.

In one or more embodiments, the recorded operations 148 searched for operations that are redundant, e.g., operations for which only the last one needs to be performed. Removal of redundant operations can be done after the constraints have been re-applied. The remaining recorded operations 148 can then be applied to the cloud database 144, and the temporary database 146 can be deleted.

In one example, a batch of operations such as inserts, updates, and/or deletes is received from a client 160. A temporary, i.e., virtual, database instance 146 is created in response to receiving the batch of operations. The batch is divided into individual operations, and each operation is processed individually using the temporary database 146. When the temporary database 146 is created, a number of resources can be seeded into the database 146, e.g., a set of seed resources that is used to provision the database 146.

In one or more examples, the storage API 142 provides an interface for storing and retrieving data, and the interface can be used by the cloud service layer 108 to access databases independently of the particular database type or vendor. The cloud database 144 can be, for example, an Oracle® relational database, and the temporary database 146 can be an in-memory database. The operations on the in-memory temporary database 146 can be performed using the same or at least similar invocations of the storage API 142 as the operations on the cloud database 144. The temporary database 146 stores trees of information, e.g., objects having parents, grandparents, and so on. If a data item in an ancestral tree is needed to perform an operations, then the temporary database 146 "faults in" the needed data item from the cloud database 144. In one aspect, an operations is attempted using the temporary database 146, and needed data is not present in the temporary database 146. For example, a data item may be present in the temporary database 146, but a constraint may indicate that the operation cannot be performed without the parent of the data item. Thus, when a needed data item is not present, the temporary database 146 generates an error, i.e., fault, which is caught and handled. The fault handler then causes the needed data item to be loaded into the temporary database 146 from the cloud database 144, and the operation that caused the fault is re-tried. This process can repeat for different data items until all of the desired operations have been performed.

In one or more embodiments, if one or more operations in a batch fails, and the batch is being processed in a best-effort mode, then the remaining operations are performed, and status is returned to the client 160 to indicate which operations failed. Certain conditions, such as collisions of c-tags, can cause the entire batch to fail. Thus, if one constraint fails, the batch can proceed, but if many constraints fail, or certain types of constraints fail, then the entire batch fails and does not proceed any further from the failure point.

In one or more examples, as data is sent to the cloud service 102, the data passes through three layers: an application layer, a bundle layer, and the storage API layer 140. When a batch of data, e.g., contacts, is sent from a device 160 to the cloud service 102, the data is received at the application layer. The batch is subdivided into two or more smaller batches to be processed by the storage API layer 140. The sizes of the smaller batches depend on the resources available. The batches of operations are preprocessed in the cloud service layer 108 before reaching the storage API layer 140 by virtually applying a set of storage API instructions to a temporary database 146, which can be an in-memory database, and recording the resulting operations. The resulting operations are then executed by the storage API 142. The preprocessing enables optimization of the size of the batches. Smaller batches result in shorter times for which accounts are locked. If larger batches are used, accounts can be locked for longer periods of time, thus increasing wait time for users and reducing system performance.

Figure 2:
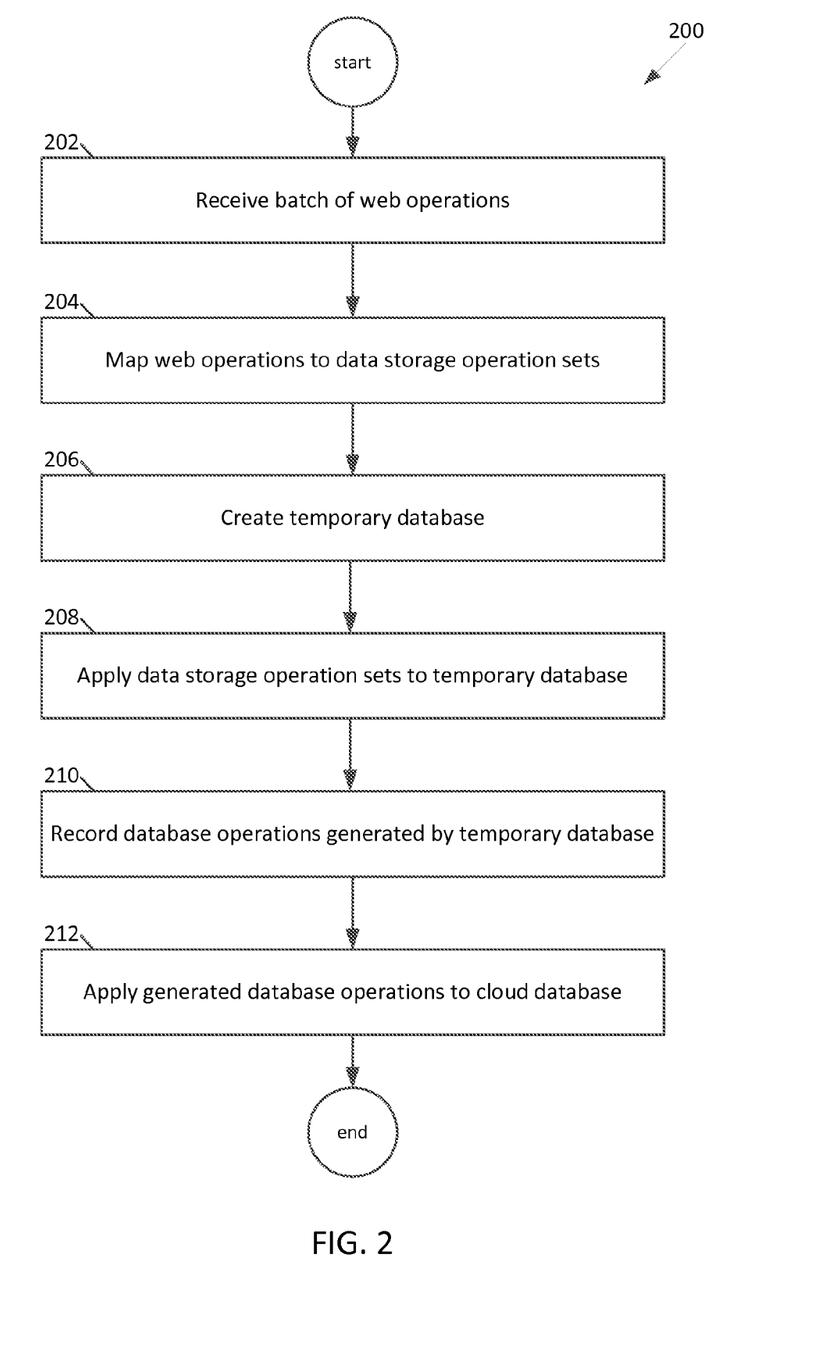
FIG. 2 is an illustrative flow diagram showing a process of applying a batch of web operations to a cloud database in accordance with one or more embodiments.

FIG. 2 is an illustrative flow diagram showing a process 200 of applying a batch of web operations to a cloud database in accordance with one or more embodiments. Process 200 can be implemented as, for example, computer program code encoded on a computer readable medium and executable by a processor of a computer system. The process begins at block 202 by receiving a batch of web operations 136 via communication layer 106. Block 204 translates the batch of web operations 136 to data storage operation sets 121. For example, block 204 can map each operation in the batch of web operations to one or more data storage operations, which are referred to herein as data storage operation sets 122, 124, 130. Thus, the data storage operation sets 122, 124, 130 may include one or more data storage operations. For example, a Get web operation 112 maps to a select data storage operation, which is the only data storage operation in the set 122 to which the Get operation 112 can be mapped. A Move web operation 116 can be mapped to the set 124 of two data storage operations, which are a delete operation 126 and an update operation 128. An insert or update operation 114 can be mapped to a set 130 of two data storage operations, which are a select operation 132 and an insert operation 131.

Block 204 generates a batch of data operation sets 121. Block 206 creates a temporary database 146, which can be initially empty, or can be populated with predetermined content, such as content from the cloud database 144 that is expected to be accessed by the operations 136, 121. In one example, the temporary database 146 is an in-memory database, i.e., the data in the temporary database is stored in memory for performance reasons. Block 208 applies the data storage operation sets 121 to the temporary database 146. The temporary database 146 can also load in additional data as needed. For example, if a data operation set 121 references a portion of data in a tree, and a constraint indicates that the entire tree is needed, then the temporary database generates a fault, the fault is caught, and the needed data, e.g., the portion of data in the tree, is loaded from the cloud database 144 into the temporary database.

The temporary database 146 can generate a record of database operations 148 that it performs while the data storage operation sets 121 are being applied. This record of database operations 148 can be, for example, a list of database transactions. Block 210 records the record of database operations 148, e.g., in a memory of the server 104, so that the record can be applied to the cloud database 144 in a transaction. In another embodiment, the record of database operations 148 is not recorded in memory, but is instead passed to the cloud database 144 in a transaction. Block 212 applies the database operations in the generated record 148 to the cloud database 144, e.g., by applying the list of database transactions to the cloud database. The cloud database 144 then processes the database operations, which result in the actions specified in the received batch of web operations 136 being applied to the cloud database 144 in accordance with applicable integrity constraints.

Figure 3:
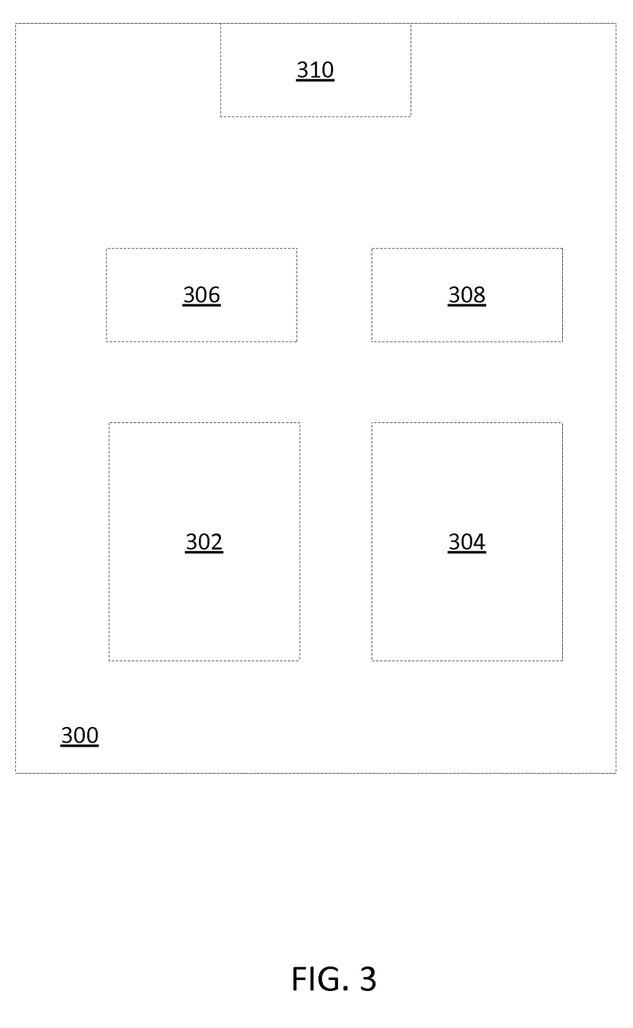
FIG. 3 illustrates a computer system in accordance with one or more embodiments.

FIG. 3 shows a system block diagram of computer system 300 used to execute the software of an embodiment. Computer system 300 includes subsystems such as a central processor 302, system memory 304, fixed storage 306 (e.g., hard drive), removable storage 308 (e.g., FLASH), and network interface 310. The central processor 302, for example, can execute computer program code (e.g., an operating system) to implement the invention. An operating system is normally, but necessarily) resident in the system memory 304 during its execution. Other computer systems suitable for use with the invention may include additional or fewer subsystems. For example, another computer system could include more than one processor 302 (i.e., a multi-processor system) or a cache memory.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method, comprising:
by a computer device:
receiving a batch of web operations that specify an action to be performed on application data stored in a cloud database, wherein the batch of web operations comprises one or more constraints associated with a database state;
generating a temporary database in response to receiving the batch of web operations, wherein the temporary database includes data copied from the cloud database;
removing the one or more constraints from the batch of web operations to yield a modified batch of web operations;
translating the modified batch of web operations to a first set of database operations that are compatible with a data storage interface of the cloud database;
applying the first set of database operations to the temporary database;
generating, in response to applying the first set of database operations to the temporary database, a second set of database operations based on the first set of database operations applied to the temporary database;
re-applying the one or more constraints to the second set of database operations; and
applying the second set of database operations with the one or more constraints to the cloud database.

2. The method of claim 1, wherein translating the batch of web operations includes:
mapping the action to be performed on the cloud database, and
mapping one or more data objects to one or more application data items in the cloud database.

3. The method of claim 1, wherein the data copied from the cloud database for the temporary database is limited to data needed for performing the batch of web operations.

4. The method of claim 1, wherein the second set of database operations specify one or more relational database actions to be performed on the application data stored in the cloud database.

5. The method of claim 4, wherein the second set of database operations comprise operations to insert, update, or delete data in the cloud database.

6. The method of claim 1, further comprising:
determining a sub-batch size based upon available resources; and
dividing the batch of web operations into sub-batches having sizes based upon the sub-batch size, wherein translating the batch of web operations comprises translating one sub-batch of the sub-batches to a subset of data storage operations, and applying the first set of database operations to the temporary database comprises applying the subset of data storage operations to the temporary database.

7. The method of claim 1, wherein the batch of web operations specify the action to be performed on one or more data objects that are identified by one or more web addresses.

8. The method of claim 7, wherein the batch of web operations comprise operations to get, insert, update, or delete data associated with the one or more data objects specified in the batch of web operations.

9. The method of claim 1, wherein generating the second set of database operations comprises rejecting one or more web operations from the batch of web operations that do not satisfy one or more other constraints.

10. The method of claim 1, wherein applying the first set of database operations to the temporary database causes a fault to occur when the temporary database does not contain one or more data items referenced by the first set of database operations.

11. The method of claim 1, further comprising:
after re-applying the one or more constraints to the second set of database operations, removing at least one redundant database operation from the second set of database operations to yield a modified second set of database operations;
applying the modified second set of database operations to the cloud database; and
deleting the temporary database subsequent to applying the modified second set of database operations to the cloud database.

12. The method of claim 1, wherein creating the temporary database comprises:
creating an empty database instance, and
storing a predetermined subset of contents of the cloud database in the temporary database.

13. The method of claim 1, wherein each web operation of the batch of web operations is associated with one or more other constraints that specify conditions in which the web operation is to be performed, and the one or more other constraints are translated to one or more database constraints that are applied to the cloud database.

14. A system, comprising:
a processor; and
a memory configured to store instructions that, when executed by the processor, cause the system to perform steps that include:
receiving a batch of web operations that specify an action be performed on application data stored in a cloud database, wherein the batch of web operations comprises one or more constraints associated with a database state;
generating a temporary database in response to receiving the batch of web operations, wherein the temporary database includes data copied from the cloud database;
removing the one or more constraints from the batch of web operations to yield a modified batch of web operations;
translating the modified batch of web operations to a first set of database operations that are compatible with a data storage interface of the cloud database;
applying the first set of database operations to the temporary database;
generating, in response to applying the first set of database operations to the temporary database, a second set of database operations based on the first set of database operations applied to the temporary database;
re-applying the one or more constraints to the second set of database operations; and
applying the second set of database operations with the one or more constraints to the cloud database.

15. The system of claim 14, wherein the steps further include:
mapping the action to be performed on the on the cloud database, and
mapping one or more data objects to one or more application data items in the cloud database.

16. The system of claim 14, wherein the steps further include:
causing a fault to occur when the temporary database does not contain one or more data items referenced by the first set of database operations; and
loading the one or more data items into the temporary database in response to the fault.

17. The system of claim 14, wherein each web operation of the batch of web operations is associated with one or more other constraints that specify conditions in which the web operation is to be performed, and the one or more other constraints are translated to one or more database constraints that are applied to the cloud database.

18. A non-transitory computer readable storage medium configured to store instructions that, when executed by a processor included in a computing device, cause the computing device to carry out steps that include:
receiving a batch of web operations that specify an action to be performed on application data stored in a cloud database, wherein the batch of web operations comprises one or more constraints associated with a database state;
generating a temporary database in response to receiving the batch of web operations, wherein the temporary database includes data copied from the cloud database;
removing the one or more constraints from the batch of web operations to yield a modified batch of web operations;
translating the modified batch of web operations to a first set of database operations that are compatible with a data storage interface of the cloud database;
applying the first set of database operations to the temporary database;
generating, in response to applying the first set of database operations to the temporary database, a second set of database operations based on the first set of database operations applied to the temporary database;
re-applying the one or more constraints to the second set of database operations; and applying the second set of database operations with the one or more constraints to the cloud database.

19. The non-transitory computer readable storage medium of claim 18, wherein the data copied from the cloud database for the temporary database is limited to data needed for performing the batch of web operations.

20. The non-transitory computer readable storage medium of claim 18, wherein the steps further include:
- determining a sub-batch size based upon available resources; and
- partitioning the batch of web operations into sub-batches having sizes based upon the sub-batch size, wherein translating the batch of web operations comprises translating one sub-batch of the sub-batches to a subset of data storage operations, and applying the first set of database operations to the temporary database comprises applying the subset of data storage operations to the temporary database.

* * * * *